United States Patent
Farooq et al.

(10) Patent No.: US 11,332,094 B2
(45) Date of Patent: May 17, 2022

(54) AIRBAG INFLATABLE ACROSS OPENING IN VEHICLE BODY

(71) Applicant: Ford Global Technologies, LLC, Dearborn, MI (US)

(72) Inventors: S. M. Iskander Farooq, Novi, MI (US); Anil Kalra, Canton, MI (US); Mohammad Omar Faruque, Ann Arbor, MI (US); Dean M. Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/907,627

(22) Filed: Jun. 22, 2020

(65) Prior Publication Data

US 2021/0394702 A1    Dec. 23, 2021

(51) Int. Cl.
*B60R 21/213* (2011.01)
*B60R 21/214* (2011.01)
*B60R 21/232* (2011.01)
*B60R 21/231* (2011.01)
*B60R 21/02* (2006.01)

(52) U.S. Cl.
CPC ......... *B60R 21/213* (2013.01); *B60R 21/214* (2013.01); *B60R 21/232* (2013.01); *B60R 2021/028* (2013.01); *B60R 2021/23192* (2013.01)

(58) Field of Classification Search
CPC ..... B60R 21/08; B60R 21/213; B60R 21/214; B60R 21/232; B60R 2021/0072; B60R 2021/028; B60R 2021/161; B60R 2021/23107; B60R 2021/23192
See application file for complete search history.

(56) References Cited

U.S. PATENT DOCUMENTS

| | | | |
|---|---|---|---|
| 3,804,435 A | 4/1974 | See et al. | |
| 5,462,308 A * | 10/1995 | Seki | B60R 21/08 280/730.2 |
| 5,707,075 A | 1/1998 | Kraft et al. | |
| 5,752,713 A * | 5/1998 | Matsuura | B60R 21/21 280/730.1 |
| 6,116,644 A | 9/2000 | Viano et al. | |
| 6,135,497 A * | 10/2000 | Sutherland | B60R 21/08 280/748 |
| 6,189,960 B1 * | 2/2001 | Mumura | B60J 7/0015 160/7 |
| 6,237,938 B1 * | 5/2001 | Boxey | B60R 21/232 280/730.2 |
| 6,435,545 B1 * | 8/2002 | Osentoski | B60R 21/232 280/730.2 |

(Continued)

Primary Examiner — Laura Freedman
(74) Attorney, Agent, or Firm — Frank A. MacKenzie; Bejin Bieneman PLC

(57) ABSTRACT

An assembly for a vehicle includes a vehicle body having an opening. The assembly includes a track supported by the vehicle body. The track extends along the opening. The assembly includes an airbag supported by the vehicle body. The airbag is slidably engaged with the track. The airbag is inflatable across the opening and along the track to an inflated position. The assembly includes a pyrotechnic device supported by the vehicle body and connected to the airbag. The airbag is slidable along the track by the pyrotechnic device to the inflated position.

17 Claims, 6 Drawing Sheets

(56) References Cited

U.S. PATENT DOCUMENTS

| | | | | |
|---|---|---|---|---|
| 6,474,681 | B2 * | 11/2002 | Peer | B60R 21/232 280/730.2 |
| 6,672,619 | B1 * | 1/2004 | Ennerdal | B60R 21/08 280/748 |
| 6,733,035 | B2 * | 5/2004 | Thomas | B60R 21/232 280/730.2 |
| 6,773,031 | B2 * | 8/2004 | Haig | B60R 21/08 280/730.2 |
| 6,851,739 | B2 * | 2/2005 | Morley | B60J 1/08 280/756 |
| 6,893,045 | B2 * | 5/2005 | Inoue | B60R 13/02 280/730.2 |
| 6,986,528 | B2 * | 1/2006 | Inoue | B60R 13/02 280/730.2 |
| 7,125,069 | B2 * | 10/2006 | Cacucci | B60R 21/02 296/190.03 |
| 7,464,962 | B2 * | 12/2008 | Hakansson | B60R 21/08 280/749 |
| 7,946,615 | B2 * | 5/2011 | Takahashi | B60J 1/2011 280/730.2 |
| 8,511,735 | B2 * | 8/2013 | Lee | B60J 7/0573 296/97.4 |
| 9,016,717 | B1 | 4/2015 | Clauser et al. | |
| 9,333,934 | B2 * | 5/2016 | Sitko | B60R 21/2338 |
| 9,428,138 | B2 | 8/2016 | Farooq et al. | |
| 9,771,048 | B2 * | 9/2017 | Min | B60R 21/2338 |
| 9,994,182 | B1 * | 6/2018 | Jaradi | B60R 21/232 |
| 10,272,868 | B2 | 4/2019 | Jaradi et al. | |
| 10,279,770 | B2 * | 5/2019 | Faruque | B60R 21/2342 |
| 10,399,527 | B2 * | 9/2019 | Schutt | B60R 21/08 |
| 10,427,637 | B2 * | 10/2019 | Raikar | B60J 7/02 |
| 10,449,923 | B2 * | 10/2019 | Son | B60R 21/214 |
| 10,471,924 | B2 * | 11/2019 | Min | B60R 21/214 |
| 10,549,707 | B2 * | 2/2020 | Ghannam | B62D 25/04 |
| 10,556,564 | B2 * | 2/2020 | Lee | B60R 21/214 |
| 10,604,103 | B2 * | 3/2020 | Lee | B60R 21/233 |
| 10,639,973 | B2 * | 5/2020 | Sommer | B60R 21/06 |
| 10,682,972 | B2 * | 6/2020 | Faruque | B60R 21/08 |
| 11,021,128 | B2 * | 6/2021 | Raikar | B60J 7/0023 |
| 2019/0061666 | A1 * | 2/2019 | Sommer | B62D 25/06 |
| 2019/0210555 | A1 * | 7/2019 | Koo | B60R 21/2334 |
| 2020/0139918 | A1 * | 5/2020 | Koo | B60R 21/231 |
| 2021/0101556 | A1 * | 4/2021 | Jaradi | B60R 21/205 |
| 2021/0229619 | A1 * | 7/2021 | Faruque | B60R 21/214 |
| 2021/0237675 | A1 * | 8/2021 | Min | B60R 21/2334 |

\* cited by examiner

AIRBAG INFLATABLE ACROSS OPENING IN VEHICLE BODY

BACKGROUND

A vehicle may include a vehicle body that includes features that allow an occupant to remove panels of the vehicle for aesthetic and driving appeal. As one example, the vehicle may include a roof panel that may be removed from the vehicle body to uncover openings in the vehicle body. In another example, the vehicle may include doors that may be removed from the vehicle body to uncover openings in the vehicle body.

DETAILED DESCRIPTION

Figure 1:
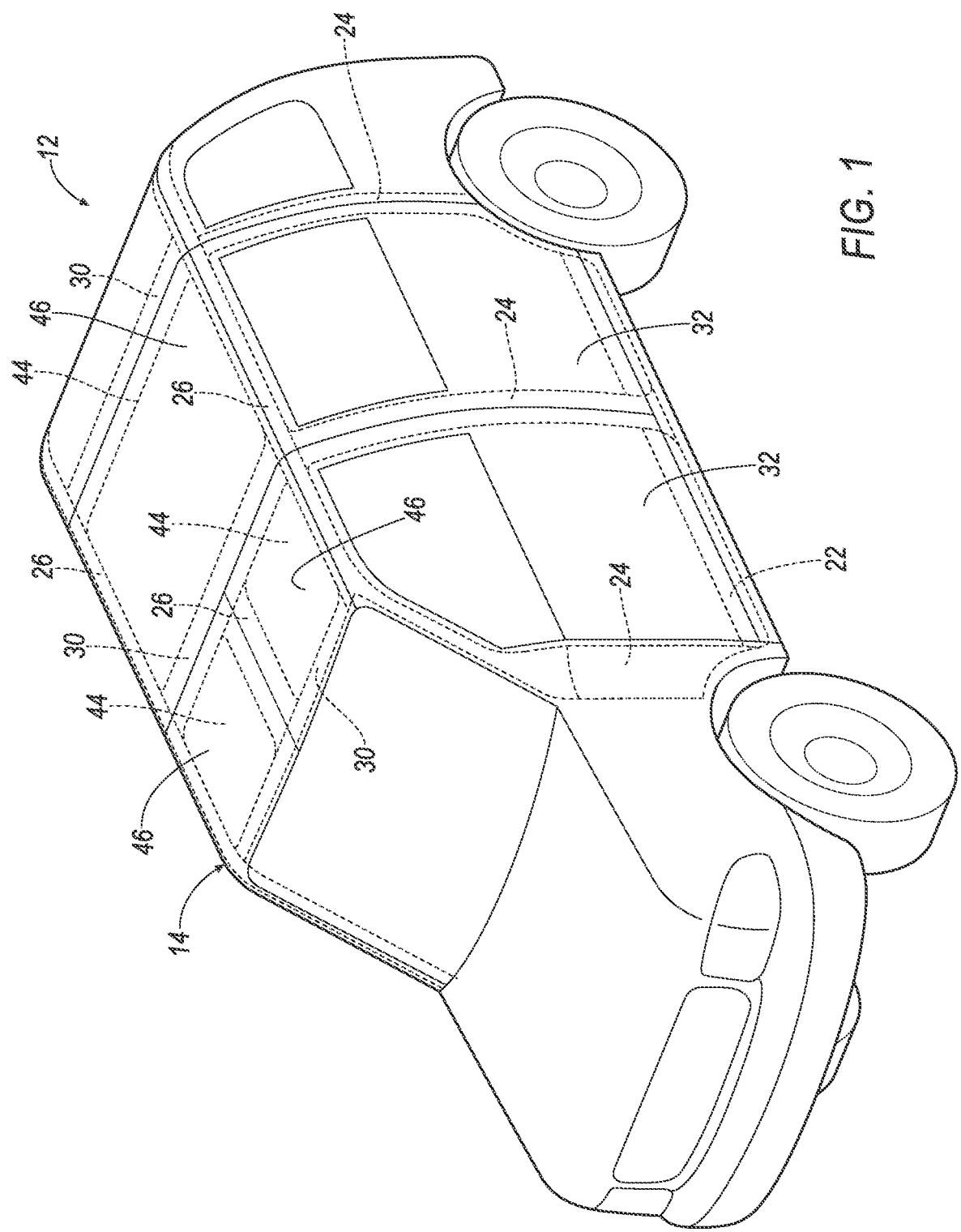
FIG. 1 is a perspective view of a vehicle having a vehicle body having openings and panels removeable from the openings.

An assembly includes a vehicle body having an opening. The assembly includes a track supported by the vehicle body and extending along the opening. The assembly includes an airbag supported by the vehicle body and slidably engaged with the track. The airbag is inflatable across the opening and along the track to an inflated position. The assembly includes a pyrotechnic device supported by the vehicle body and connected to the airbag. The airbag is slidable along the track by the pyrotechnic device to the inflated position.

The airbag may be expandable in a vehicle-forward direction to the inflated position.

The assembly may include a second track supported by the vehicle body and extending along the opening, the opening being between the track and the second track. The airbag may be slidably engaged with the second track.

The assembly may include a second pyrotechnic device supported by the vehicle body and connected to the airbag. The airbag being slidable along the second track by the second pyrotechnic device to the inflated position.

The second track may be generally parallel with the track.

The vehicle body may include a roof rail. The track may be supported by and extending along the roof rail.

The vehicle body may include a second roof rail spaced from and generally parallel to the roof rail, the vehicle body including a roof bow extending from the roof rail to the second roof rail. The opening may be between the roof rail and the second roof rail and the airbag being supported by the roof bow.

The assembly may include a second track supported by and extending along the second roof rail, the airbag being slidably engaged with the second track.

The assembly may include a second track. The vehicle body may include a second roof rail spaced from and generally parallel to the roof rail, the second track being supported by and extending along the second roof rail, the airbag being slidably engaged with the second track.

The vehicle body may include a pillar and a second pillar spaced from the pillar. The opening may be between the pillar and the second pillar and the airbag being supported by the pillar.

The assembly may include a second track supported by the vehicle body and extending along the opening. The vehicle body may include a roof rail and a rocker spaced from the roof rail, the track extending along the roof rail, and the second track extending along the rocker.

The assembly may include a door releasably attached to the vehicle body at the opening.

The assembly may include a roof panel and a floor panel spaced from the roof panel. The airbag may extend from the roof panel to the floor panel.

The assembly may include a roof panel releasably attached to the vehicle body at the opening.

The assembly may include a door and a roof panel. The door may be releasably attached to the vehicle body at the opening. The vehicle body may include a second opening. The roof panel may be releasably attached to the vehicle body at the second opening and a second airbag supported by the vehicle body and inflatable across the second opening to an inflated position.

The pyrotechnic devices may include a cable extending along the track, the cable being connected to the airbag.

The assembly may include a slider slidably engaged with the track, the slider being fixed to the airbag and fixed to the cable.

The assembly may include a slider slidably engaged with the track and fixed to the airbag.

With reference to the Figures, wherein like numerals indicate like parts throughout the several views, an assembly 10 for a vehicle 12 includes a vehicle body 14 having an opening 38, 40. The assembly 10 includes a track 16 supported by the vehicle body 14. The track 16 extends along the opening 38, 40. The assembly 10 includes an airbag 18 supported by the vehicle body 14. The airbag 18 is slidably engaged with the track 16. The airbag 18 is inflatable across the opening 38, 40 and along the track 16 to an inflated position. The assembly 10 includes a pyrotechnic device 20 supported by the vehicle body 14 and connected to the airbag 18. The airbag 18 is slidable along the track 16 by the pyrotechnic device 20 to the inflated position.

In the event of an impact to the vehicle 12, the airbag 18 inflates to the inflated position. As the airbag 18 inflates, the pyrotechnic device 20 pulls the airbag 18 along the track 16 and across the opening 38, 40. In the inflated position, the airbag 18 covers the opening 38, 40. The airbag 18 covering the opening 38, 40 allows the airbag 18 to control the kinematics of an occupant inside the vehicle 12 when the occupant is adjacent the opening 38, 40 in the vehicle body 14. The airbag 18 inflates in a vehicle-forward direction to enclose the vehicle body 14. The airbag 18 inflating in the vehicle-forward direction controls the kinematics of the occupant by retaining the occupant inside the vehicle body 14.

The vehicle 12 may be any suitable type of automobile, e.g., a passenger or commercial automobile such as a sedan, a coupe, a truck, a sport utility vehicle, a crossover vehicle, a van, a minivan, a taxi, a bus, etc. The vehicle 12, for example, may be an autonomous vehicle. In other words, the vehicle 12 may be autonomously operated such that the vehicle 12 may be driven without constant attention from a driver, i.e., the vehicle 12 may be self-driving without human input.

With reference to FIG. 1, the vehicle 12 includes the vehicle body 14. The vehicle body 14 may be of a unibody construction. In the unibody construction, the body, e.g., rockers 22, serves as a vehicle frame, and the vehicle body 14 (including the rockers 22, pillars 24, roof rails 26, etc.) is unitary, i.e., a continuous one-piece unit. As another example, the vehicle body 14 and frame may have a body-on-frame construction (also referred to as a cab-on-frame construction). In other words, the vehicle body 14 and frame are separate components, i.e., are modular, and the vehicle body 14 is supported on and affixed to the frame. Alternatively, the vehicle body 14 may have any suitable construction. The vehicle body 14 may be formed of any suitable material, for example, steel, aluminum, etc.

The vehicle body 14 defines a passenger cabin 28 to house occupants, if any, of the vehicle 12. The passenger cabin 28 may extend across the vehicle 12, i.e., from one side to the other side of the vehicle 12. The passenger cabin 28 includes a front end and a rear end with the front end being in front of the rear end during forward movement of the vehicle 12.

With continued reference to FIG. 1, the vehicle body 14 includes at least two roof rails 26. The roof rails 26 are spaced from one another in a cross-vehicle direction and are generally parallel to each other in the cross-vehicle direction. The roof rails 26 each extend longitudinally along the vehicle body 14, i.e., along a longitudinal axis of the vehicle body 14. In addition to the at least two roof rails 26, the vehicle body 14 may include any suitable number of roof rails 26 spaced from one another and extending longitudinally along the vehicle body 14.

The vehicle body 14 includes at least one roof bow. The roof bow 30 extends from one roof rail 26 to the other roof rail. The roof bow 30 is irremovably fixed to both roof rails 26. In other words, the roof bow 30 is secured to the roof rails 26 in such a way that removal requires destruction such as cutting, e.g., cutting material and/or welded joints, etc. As an example, the roof bow 30 may be attached to both roof rails 26, e.g., by welding, fasteners, etc. In addition to the at least one roof bow, the vehicle body 14 may include any suitable number of roof bows 30 spaced from one another and extending from one roof rail 26 to the other rail.

The vehicle body 14 includes doors 32. The doors 32 openable for occupants to enter and exit a passenger cabin 28. The roof rails 26 contact a top edge of the doors 32. Each door 32 may include a door trim, a door frame, and a door panel. The door trim and the door panel are fixed relative to the door frame. The door trim is inboard relative to the door frame, and the door panel is outboard relative to the door frame. The door 32 includes a window opening completely closed by the window when the window is in a fully raised position. The window opening may be defined by the door trim and door panel on a bottom edge and either by the door 32 circumscribing the window opening or by the body, e.g., the A pillar, the B pillar, and the roof rail. The door panel faces outboard relative to the vehicle 12.

The vehicle body 14 includes two rockers 22 spaced from the roof rails 26 below the roof rails 26. The rockers 22 are below the passenger cabin 28. The rockers 22 extend along the vehicle-longitudinal axis, e.g., between wheels of the vehicle 12. The doors 32 of the vehicle 12 are above the rocker 22 when the doors 32 are in a closed position.

The vehicle body 14 may include pillars 24 spaced from each other longitudinally along the vehicle body 14. For example, the vehicle body 14 may include an A-pillar and a B-pillar on each side of the vehicle 12 with the A-pillar being spaced from the B-pillar. The A-pillars may extend between the windshield and the front doors 32. In other words, the A-pillars may be disposed at the front end of the passenger cabin 28. The vehicle 12 may include additional pillars 24, e.g., C-pillars, D-pillars. The pillars 24 may extend from the roof to the floor, i.e., from the roof rails 26 to the rockers 22. The B-pillars may extend behind front doors 32, e.g., between adjacent doors 32.

The body includes the vehicle floor. The vehicle floor may define the lower boundary of the passenger cabin 28 and may extend from the front end of the passenger cabin 28 to the rear end of the passenger cabin 28. The vehicle floor may include a floor panel 34 and upholstery on the vehicle floor. The upholstery may be, for example, carpet, and may have a class-A surface facing the passenger cabin 28, i.e., a surface specifically manufactured to have a high quality, finished, aesthetic appearance free of blemishes. The vehicle floor may include cross-beams (not shown) connected to the floor panel 34 and to other components of the body.

With reference to FIGS. 1-5, the vehicle 12 includes at least one seat 36, 38, 40. Specifically, the vehicle 12 may include any suitable number of seats 36, 38, 40. As shown in FIGS. 2-5, the seats 36, 38, 40 are supported by the vehicle floor. The seats 36, 38, 40 may be arranged in any suitable arrangement in the passenger cabin 28. For example, one or more of the seats 36, 38, 40 may be at the front end of the passenger cabin 28, e.g., a driver seat 36 and/or a passenger seat 38, and/or one or more of the seats 36, 38, 40 may be at the rear end of the passenger cabin 28, i.e., a rear seat 40. As shown in the Figures, the rear seat 40 may extend in the cross-vehicle direction across the passenger cabin 28.

Figure 2:
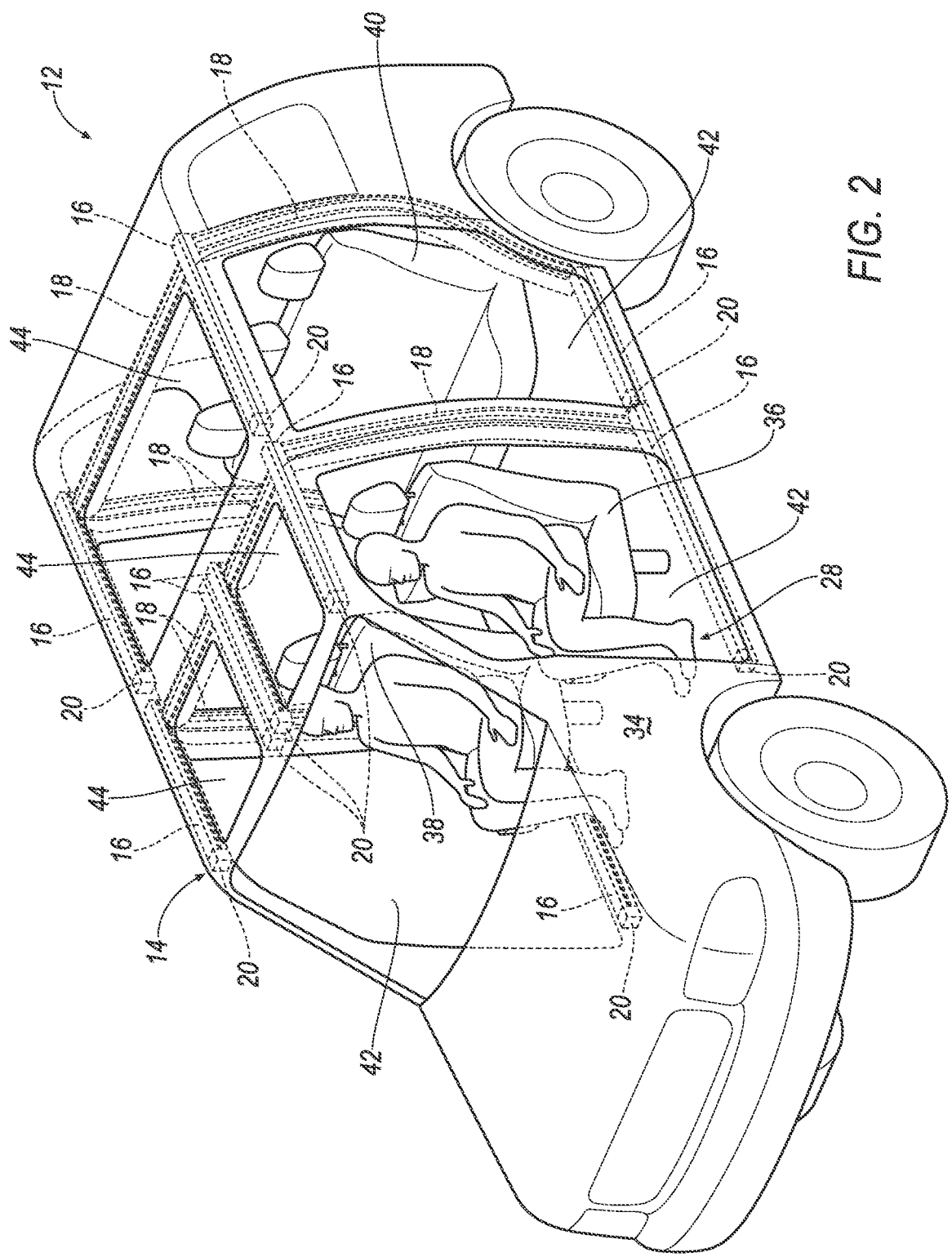
FIG. 2 is a perspective view of the vehicle including airbags supported by the vehicle body at the openings.

With reference to FIGS. 1 and 2, the vehicle body 14 includes at least one opening 38, 40 and at least one panel 32, 46 releasably attached to the rest of the vehicle body 14 at the opening 38, 40. The panel 32, 46 at least partially covers the opening 38, 40 when attached to the rest of the vehicle body 14 at the opening 38, 40. As an example, the opening 38 may be a door opening 42 and the panel 32 may be a removable door 32. As another example, the opening 40 may be a roof opening 44 and the panel 46 may be a removable roof panel 46. The opening 38, 40 extends through the body from the passenger compartment to the exterior of the vehicle 12 with no component therebetween in at least part of the opening 38, 40.

In the example in which the vehicle body 14 includes one or more roof openings 44, the roof opening 44 is between the roof rails 26. The roof opening 44 may extend across a cross-vehicle width of the vehicle 12, e.g., from one roof rail 26 to the other. Such an example is shown as the roof opening 44 that are in the rear in FIGS. 1 and 2. As another example, the roof opening 44 may extend across a portion of the cross-vehicle width. For example, the roof opening 44 may be dedicated to the space above one of the seats 36, 38, 40. Such examples are shown as the roof openings 44 that are in the front in FIGS. 1 and 2.

The door openings 42 may be between the pillars 24. In other words, the pillars 24 are spaced from each other by the door opening. The door openings 42 allow for ingress and/or egress of the vehicle 12 by occupants.

With reference to FIG. 1, the panels 32, 46 are releasably attached to the rest of the vehicle body 14 at the openings 38, 40. When the panels 32, 46 are attached to the rest of the vehicle body 14, the panels 32, 46 cover the openings 38, 40 in the vehicle body 14 to enclose the passenger cabin 28. The panels 32, 46 may be released from the rest of the vehicle body 14 to uncover the openings 38, 40 and allow air to pass through the openings 38, 40 and into the passenger cabin 28. The panels 32, 46 may be removable from the rest of the vehicle body 14 by the occupant of the vehicle 12 to allow the openings 38, 40 to be exposed, i.e., uncovered, when operating the vehicle 12.

When attached to the rest of the vehicle body 14 at the roof opening 44, the roof panel 46 has an outer surface exposed to the exterior of the vehicle 12 and an inner surface exposed to the passenger cabin 28. The roof panel 46 may be, for example, a clear or opaque material such as glass or plastic. As another example the roof panel 46 may be metal. The roof panel 46 may be releasably attached, for example, by clips, clamps, and or locks on one of the roof panel 46 and the vehicle body 14 and engaged with the other of the roof panel 46 and the vehicle body 14. The clips, clamps, locks, etc., may be manually operated to or may be automatically operated, e.g., electronically operated.

The door 32 is rotatably attached to the rest of the vehicle body 14 at the door opening 42. For example, the door 32 may be rotatably attached to the rest of the vehicle body 14 with hinges. In such an example, the hinges are releasable to selectively release the door 32 from the rest of the vehicle body 14. The hinges may be mechanically releasable or electronically releasable.

Figure 3:
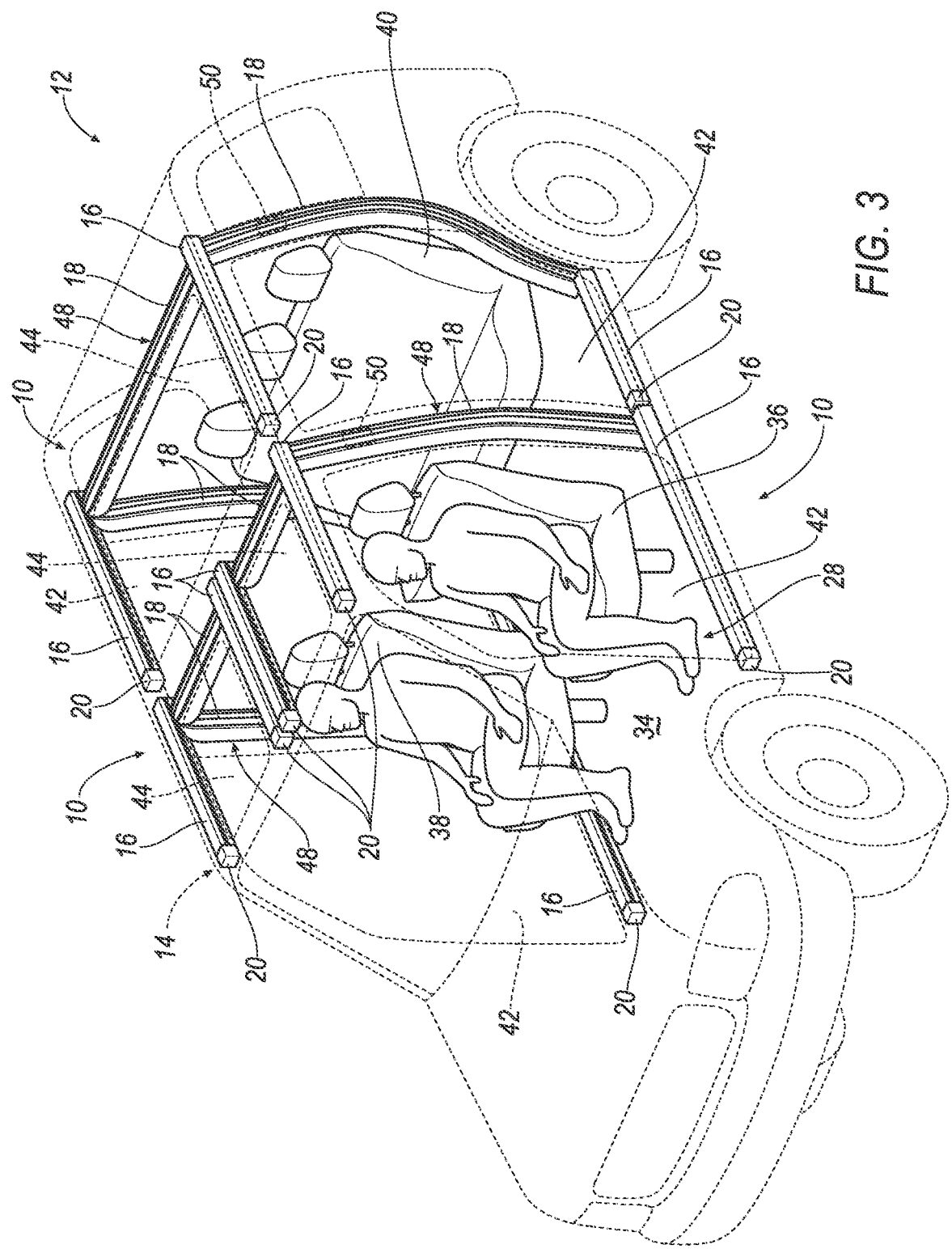
FIG. 3 is a perspective view of the vehicle with the airbags in an uninflated position.
Figure 4:
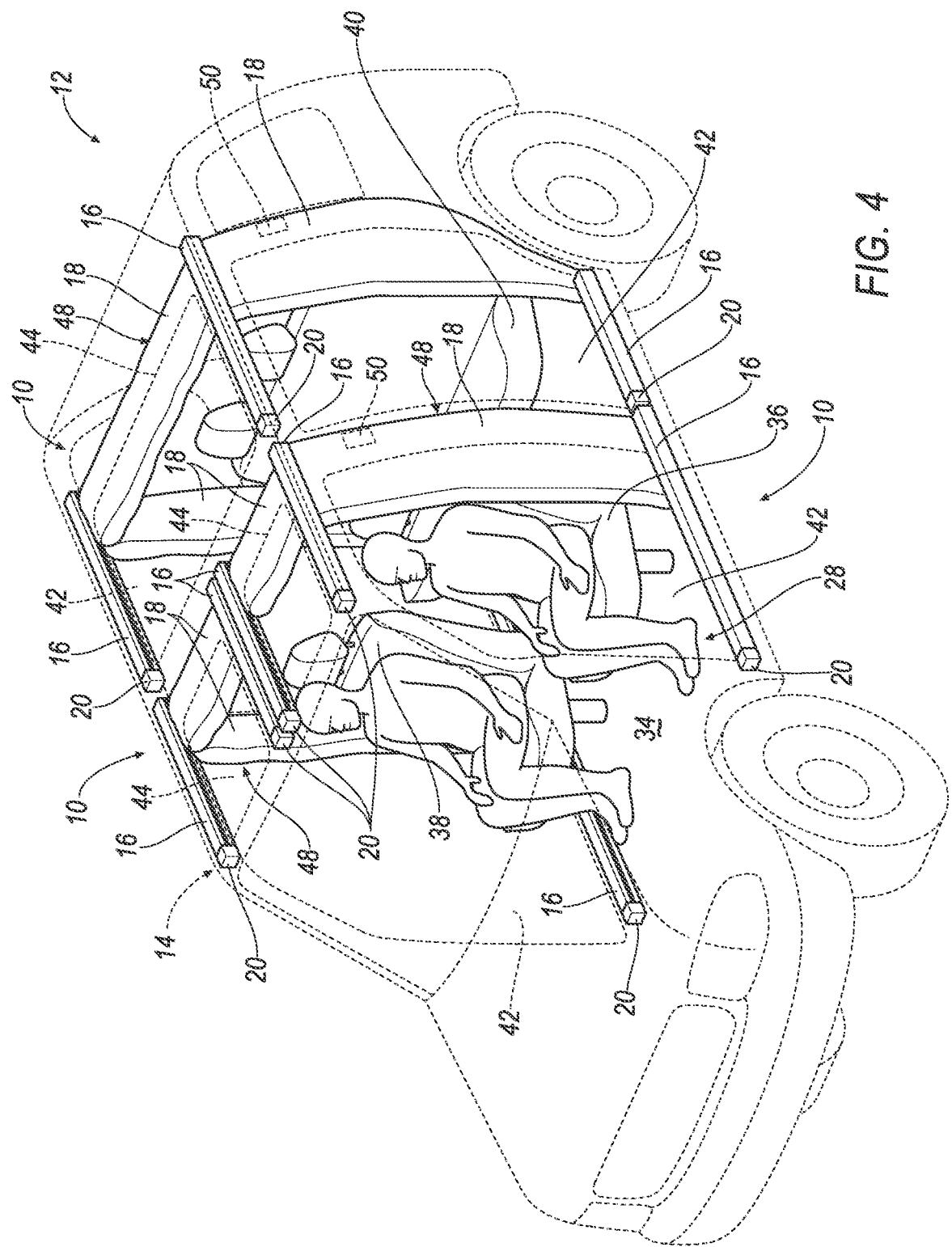
FIG. 4 is a perspective view of the vehicle with the airbags moving from the uninflated position toward an inflated position.
Figure 5:
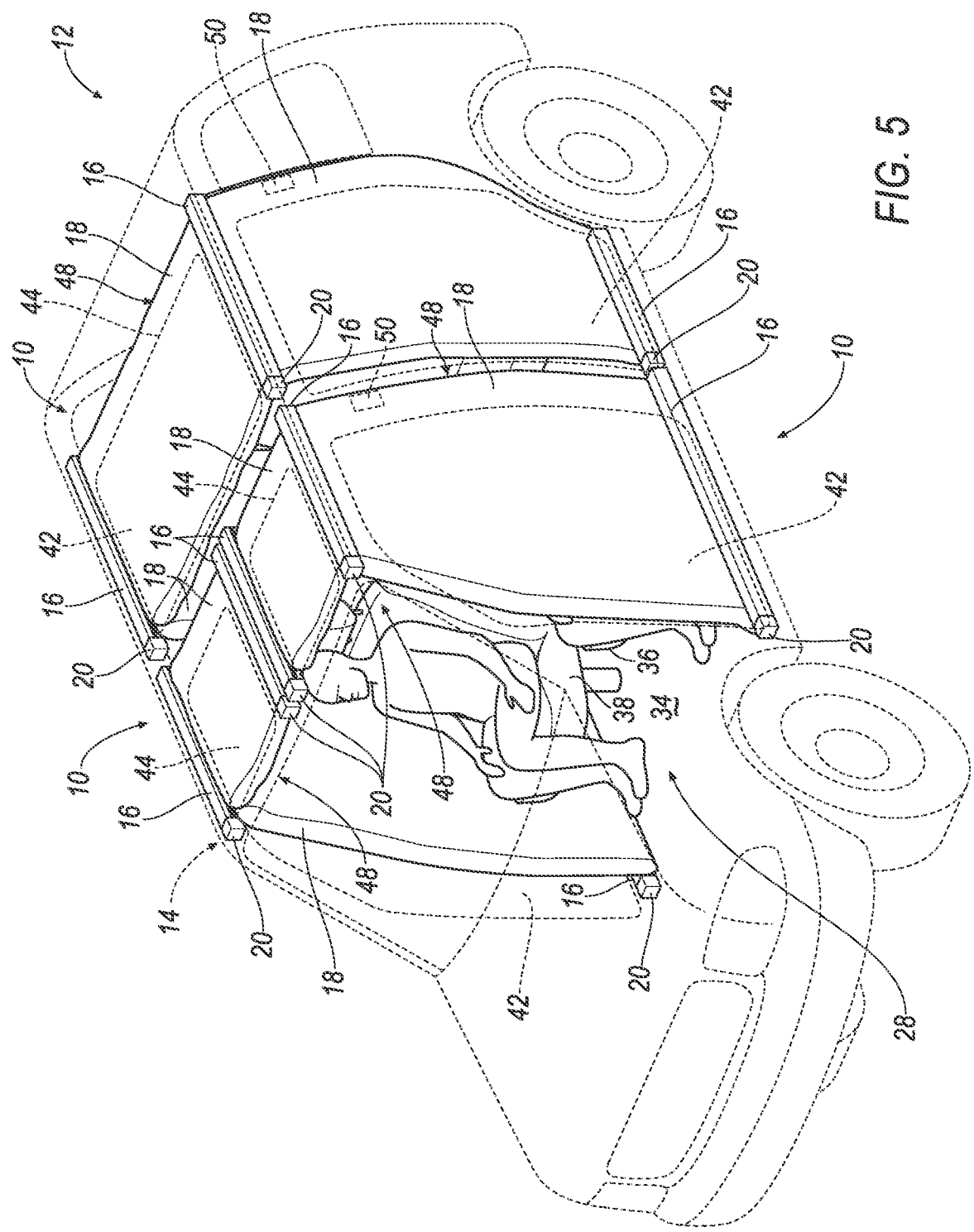
FIG. 5 is a perspective view of the vehicle with the airbags in the inflated position.

With reference to FIGS. 3-5, the assembly 10 includes an airbag assembly 48. The airbag assembly 48 includes an inflator 50 and the airbag 18. The airbag 18 may be packaged, e.g., rolled, z-folded, etc., and secured directly to the vehicle body 14. As another example, the airbag assembly 48 may include a housing. The housing may provide a reaction surface for the airbag 18 in the inflated position. The housing may be supported by the vehicle body 14, e.g., the housing may be supported by the roof bows 30 or the housing may be supported by the pillars 24. The housing may be of any material, e.g., a rigid polymer, a metal, a composite, etc.

The inflator 50 is in fluid communication with the airbag 18. The inflator 50 expands the airbag 18 with inflation medium, such as a gas, to move the airbag 18 from the uninflated position to the inflated position. The inflator 50 may be supported by any suitable component. For example, the inflator 50 may be supported directly by the vehicle body 14, by the housing, etc. The inflator 50 may be, for example, a pyrotechnic inflator 50 that ignites a chemical reaction to generate the inflation medium, a stored gas inflator 50 that releases (e.g., by a pyrotechnic valve) stored gas as the inflation medium, or a hybrid. The inflator 50 may be, for example, at least partially in the inflation chamber to deliver inflation medium directly to the inflation chamber or may be connected to the inflation chamber through fill tubes, diffusers, etc.

With continued reference to FIGS. 3-5, the airbag assembly 48 is supported by the vehicle body 14. In one example, the airbag assembly 48 may be supported by the roof bow, i.e., the airbag 18 may be supported by the roof bow. In another example, the airbag assembly 48 may be supported by the pillar 24, i.e., the airbag 18 may be supported by the pillar 24. In yet another example, the airbag assembly 48 may be supported by a combination of the roof bow 30 and the pillar 24. The airbag 18 and the inflator 50 may be supported by the same component or different components of the vehicle body 14. The airbag 18 is inflatable from an uninflated position to the inflated position.

With reference to FIGS. 4 and 5, the airbag 18 is expandable in a vehicle-forward direction to the inflated position. Specifically, the airbag 18 expands toward the front end of the passenger cabin 28. In an example where the airbag 18 is supported by the roof bow, the airbag 18 is inflatable away from the roof bow 30 to the inflated position in the vehicle-forward direction. In an example where the airbag 18 is supported by the pillar 24, the airbag 18 is inflatable away from the pillar 24 to the inflated position in the vehicle-forward direction. By moving in the vehicle-forward direction, the airbag 18, during deployment, may reduce the risk of partial ejection of occupants through the opening 38, 40.

The airbag 18 is inflatable across the opening 38, 40 in the vehicle body 14. The airbag 18 extends across the opening 38, 40 as the airbag 18 inflates to the inflated position. In other words, airbag 18 in the inflated position at least partially covers the opening 38, 40. The airbag 18 may cover the opening 38, 40 by any suitable amount to control the kinematics of the occupant that is adjacent the opening 38, 40 in the vehicle body 14. In some examples, the airbag 18 may entirely cover the opening 38, 40, i.e., the airbag 18 may cover the whole opening 38, 40. In other examples, the airbag 18 may partially cover the opening 38, 40, i.e., the airbag 18 may cover only a portion of the opening 38, 40. In an example where the airbag 18 is supported by the pillar 24, the airbag 18 may extend from one pillar 24 toward another pillar 24 across the opening 38, 40, either entirely or partially. In an example where the airbag 18 is supported by the roof bow, the airbag 18 may extend from one roof bow 30 toward another roof bow 30 across the opening 38, 40, either entirely or partially. The airbag 18 may abut the vehicle body 14 at the opening 38, 40 when the airbag 18 is in the inflated position.

In the example in which the airbag assembly 48 is supported by the pillar 24, the airbag 18 may extend from the roof panel 46 to the floor panel 34. Specifically, in an example where the airbag 18 is supported by the pillar 24, the airbag 18 extends from the roof panel 46 to the floor panel 34. Specifically, the airbag 18 covers the opening 38, 40 from the roof panel 46 to the floor panel 34.

As shown in FIGS. 2-5, the assembly 10 may include multiple airbags 18. In one example, the assembly 10 may include two airbags 18. In such an example, the first of the two airbags 18 may be supported by the pillar 24 and the second of the two airbags 18 may be supported by the roof bow. The airbags 18 inflate simultaneously to the inflated position in the event of an impact to the vehicle 12. Such an example as described above may be positioned adjacent a driver or a passenger seat 38 in the vehicle 12. When the airbags 18 are in the inflated position, the assembly 10 may partially surround an occupant seated adjacent the assembly 10 in either the driver or passenger seat 38.

In another example, the assembly 10 may include three airbags 18. In such an example, the first of the three airbags 18 may be supported by one of the pillars 24, the second of the three airbags 18 may be supported by the roof bow, and the third of the three airbags 18 may be supported by another of the pillars 24 on an opposite side of the vehicle 12 from the other pillar 24. The three airbags 18 inflate simultaneously to the inflated position in the event of an impact to the vehicle 12. Such an example as described above, the assembly 10 may be adjacent the rear seat 40 in the vehicle 12. When the airbags 18 are in the inflated position, the assembly 10 may surround an occupant seated in the rear seat 40.

In examples where the assembly 10 includes multiple airbags 18, as shown in the Figures, the airbags 18 may be separate from each other, i.e., airbags 18 may be fluidly isolated from each other. In such examples, each of the airbags 18 may be inflated with a respective inflator 50, i.e., a separate inflator 50 may be used to inflate the airbags 18.

In other examples where the assembly 10 includes multiple airbags 18, each of the airbags 18 may be inflated by a common inflator 50. In such examples, the airbags 18 may be in fluid communication with each other, e.g., via a fill tube between the airbags 18.

Figure 6:
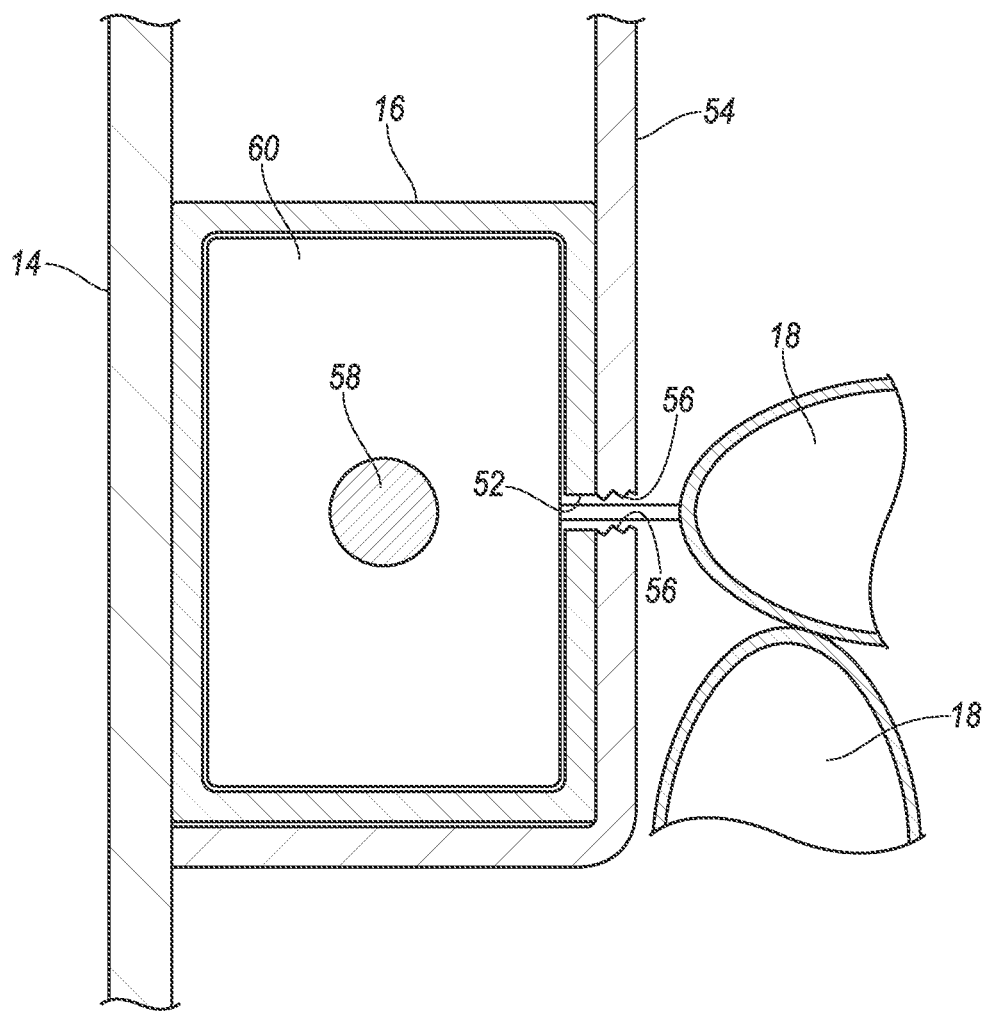
FIG. 6 is a cross-sectional view of the airbags slidably engaged with a track supported by the vehicle body.

In examples where the assembly 10 includes multiple airbags 18, as shown in FIG. 6, the airbags 18 may be connected to each other at the track 16 supported by a roof rail. In such an example, the airbags 18 move as a unit along the track 16 to the inflated position. The airbags 18 may be connected directly to each other, e.g., one airbag 18 is connected to the other airbag 18, or indirectly to each other, e.g., each airbag 18 may be individually slidably engaged with the track, such that the airbags 18 move together along the track 16 to the inflated position.

The airbag 18 may be formed of a woven polymer or any other material. As one example, the airbag 18 may be formed of woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

With reference to FIGS. 2-5, the assembly 10 may include at least one track 16 extending along the opening 38, 40 in the vehicle body 14. The track 16 extends the length of the opening 38, 40 to guide the airbag 18 across the opening 38, 40 as the airbag 18 inflates to the inflated position. The track 16 is supported by the vehicle body 14 adjacent the opening 38, 40. In one example, the track 16 may be supported by one of the roof rails 26. The track 16 may extend along the roof rail 26 adjacent the opening 38, 40 in the vehicle body 14 to guide the airbag 18 to the inflated position. In another example, the track 16 may be supported by the rocker 22. The track 16 may extend along the rocker 22 adjacent the opening 38, 40 in the vehicle body 14 to guide the airbag 18 to the inflated position.

The airbag 18 is slidably engaged with track 16. As an example, with reference to FIG. 6, the assembly 10 may include a slider 60 fixed to the airbag 18 and slidably engaged with the track 16. The slider 60 and the airbag 18 move together as a unit along the track 16. Each of the slider 60s moves independently of the other, i.e., the slider 60 in each track 16 moves independently of the slider 60 in another track 16. A tether or any suitable connector may extend between the slider 60 and the airbag 18 to connect the slider 60 to the airbag 18. As the airbag 18 inflates to the inflated position, the sliders 60 move along the track 16 to guide the airbag 18 to the inflated position.

The track 16 may include a slot 52 extending along the track 16. The airbag 18 may be connected to the slider 60 through the slot 52 in the track 16 by a tether or any other suitable connector.

As shown in FIG. 6, the tracks 16 may be covered by upholstery 54, e.g., a headline or a carpet, to conceal the track 16 when the airbags 18 are in the uninflated position. The upholstery 54 may include a tear seam 56 that is aligned with the slot 52 in the track 16. When the airbags 18 move to the inflated position, the tear seams 56 release and allow the airbag 18 to move along the slots 52 in the tracks 16.

In the example shown in the Figures, the assembly 10 includes two tracks 16 on opposite sides of the opening 38, 40. Specifically, the opening 38, 40 is between the two tracks 16. The two tracks 16 may be supported by the roof rails 26 on opposite sides of the opening 38, 40, i.e., the first of the two tracks 16 may be supported by one roof rail 26 and the second of the two tracks 16 may be supported by another of the roof rails 26 on opposite sides of the opening 38, 40. In such an example, the two tracks 16 may be generally parallel to each other. The two tracks 16 are adjacent the opening 38, 40 in the vehicle body 14. The airbag 18 is slidably engaged with both the tracks 16. The tracks 16 guide the airbag 18 into the inflated position and support the airbag 18 on both sides of the opening 38, 40 as the airbag 18 inflates to the inflated position. The tracks 16 may be referenced as track 16 and second track 16.

In the example shown in the Figures, the assembly 10 includes multiple tracks 16 and multiple airbags 18. In one example, as shown in the Figures adjacent the driver seat 36 and the passenger seat 38, the assembly 10 includes three tracks 16 and two airbags 18. The tracks 16 and the airbags 18 are supported by the vehicle body 14. In such an example, the vehicle body 14 includes two openings 38, 40. The first of the two openings 40 may be between the roof rails 26 and the second of the two openings 38 may be between the pillars 24. The first of the two airbags 18 is inflatable across the first of the openings 40 to the inflated position and the second of the two airbags 18 is inflatable across the second of the openings 38 to an inflated position. The first of the two airbags 18 is supported by the roof bow 30 and the second of the two airbags 18 is supported by the pillar 24. The assembly 10 includes two tracks 16 extending along the roof rails 26 on opposite sides of the first of the two openings 38, 40 and another track 16 extending along the rocker 22 adjacent to the second of the two openings 38, 40. The tracks 16 may be referenced as track 16, second track 16 and third track 16.

In another example, as shown in the Figures adjacent the rear seat 40, the assembly 10 includes four tracks 16 and three airbags 18. The tracks 16 and the airbags 18 are supported by the vehicle body 14. In such an example, the vehicle body 14 includes three openings 38, 40. The first of the three openings 40 may be between the roof rails 26, the second of the three openings 38 is between two pillars 24, and the third of the three openings 38 is between two pillars 24 on an opposite side of the vehicle body 14 from the second of the openings 38. Each of the three airbags 18 is inflatable across one of the three openings 38, 40 in the vehicle body 14. Two of the airbags 18 may be supported by two pillars 24 of the vehicle body 14 and the third airbag 18 may be supported by the roof bow. The assembly 10 may include four tracks 16 with one track 16 extending along each of the roof rails 26 and rockers 22.

As shown in FIGS. 2-5, the assembly 10 may include one or more pyrotechnic devices 20 supported by the vehicle body 14. The pyrotechnic device 20 is connected to the airbag 18, i.e., the pyrotechnic device 20 pulls the airbag 18 to the inflated position. The pyrotechnic device 20 may be directly connected to the airbag 18, i.e., there are no other components are between the pyrotechnic device 20 and the airbag 18. The pyrotechnic device 20 may be indirectly connected to the airbag 18, i.e., there are other components between the pyrotechnic device 20 and the airbag 18, e.g., the slider 60.

The pyrotechnic device 20 may be positioned at an end of the track 16 opposite the airbag 18 when the airbag 18 is in the inflated position. In examples where the assembly 10 includes multiple tracks 16, such as shown in the Figures, the assembly 10 includes multiple pyrotechnic devices 20 with a pyrotechnic device 20 disposed at an end of the track 16 opposite the airbag 18. In such an example, the additional pyrotechnic devices 20 may be referred to as a second pyrotechnic device 20 and/or a third pyrotechnic device 20.

The pyrotechnic device 20 may move the airbag 18 from the uninflated position to the inflated position. Specifically, the airbag 18 is slidable along the track 16 by the pyrotechnic device 20 to the inflated position. The pyrotechnic devices 20 may be connected to the sliders 60 engaged with each of the tracks 16. The pyrotechnic devices 20 may move the sliders 60 along the track 16 to move the airbag 18 to the inflated position. In the event of an impact to the vehicle 12, the pyrotechnic device 20 is activated to move the airbag 18 along the track 16 to the inflated position.

In an example where the assembly 10 includes multiple tracks 16 and multiple pyrotechnic devices 20, such as shown in the Figures, the airbag 18 is slidable along the tracks 16 by the multiple pyrotechnic devices 20 to the inflated position.

As shown in FIG. 6, the pyrotechnic device 20 may include a cable 58 extending along the track 16 and connected to the airbag 18. Specifically, the cable 58 may be connected to the slider 60, i.e., the cable 58 may be fixed to the slider 60. When the pyrotechnic device 20 is actuated in the event of an impact to the vehicle 12, the cable 58 retracts toward the v and slide the airbag 18 along the track 16 to the inflated position.

The pyrotechnic device 20 may be rotary pretensioning devices, linear pretensioning devices, or any other suitable pyrotechnic device 20 to move the sliders 60 and airbag 18 along the tracks 16. The pyrotechnic device 20 includes a rotary cylinder or a piston connected to the cable 58 and a pyrotechnic charge that moves the rotary cylinder or the piston. The pyrotechnic charge is combustible to produce a gas. The pyrotechnic charge may be formed of a solid mixture of substances that, when ignited, react to produce the gas. For example, the pyrotechnic charge may be formed of sodium azide ($NaNO_3$), potassium nitrate ($KNO_3$), and silicon dioxide ($SiO_2$), which react to form nitrogen gas ($N_2$).

As shown in the Figures, the vehicle 12 may include multiple assemblies positioned adjacent different seats 36, 38, 40 in the vehicle 12. An assembly 10 may be positioned adjacent the driver seat 36, a separate assembly 10 may be positioned adjacent the passenger seat 38, and another assembly 10 may be positioned adjacent the rear seat 40.

The vehicle 12 may include impact sensors (not shown) that may become activated in the event of an impact to the vehicle 12. The impact sensor may be in communication with the controller. The impact sensor is programmed to detect an impact to the vehicle 12. The impact sensor may be of any suitable type, for example, post-contact sensors such as accelerometers, pressure sensors, and contact switches; and pre-impact sensors such as radar, LIDAR, and vision-sensing systems. The vision systems may include one or more cameras, CCD image sensors, CMOS image sensors, etc. The impact sensor may be located at numerous points in or on the vehicle 12.

The vehicle controller, implemented via circuits, chips, or other electronic components, is included in the vehicle control system for carrying out various operations, including as described herein. The vehicle controller is a computing device that generally includes a processor and a memory, the memory including one or more forms of computer-readable media, and storing instructions executable by the processor for performing various operations, including as disclosed herein. The memory of the vehicle controller further generally stores remote data received via various communications mechanisms; e.g., the vehicle controller is generally configured for communications on a controller area network (CAN) bus or the like, and/or for using other wired or wireless protocols, e.g., Bluetooth, etc. The vehicle controller may also have a connection to an onboard diagnostics connector (OBD-II). Via a communication network using Ethernet, WiFi, the CAN bus, Local Interconnect Network (LIN), and/or other wired or wireless mechanisms, the vehicle controller may transmit messages to various devices in the vehicle 12 and/or receive messages from the various devices, e.g., controllers, actuators, sensors, etc., e.g., controllers and sensors as discussed herein. For example, the vehicle controller may receive data from vehicle sensors. Although one vehicle controller is shown in FIG. 1 for ease of illustration, it is to be understood that the vehicle controller could include, and various operations described herein could be carried out by, one or more computing devices.

In the event of an impact to the vehicle 12, the impact sensor may detect the impact and transmit a signal through the communications network to the vehicle controller. The vehicle controller may transmit a signal through the communications network to the inflator 50. The inflator 50 discharges and inflates the airbag 18. In the example in the Figures, the pyrotechnic device 20 is actuated to begin to move the airbag 18 along the tracks 16. Tear seams 56 in the headliner and/or carpet may release to allow the airbag 18 to move along the track 16 as the airbag 18 inflates to the inflated position.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly, comprising:
a vehicle body having a first opening;
a first track supported by the vehicle body and extending along the first opening;
a first airbag supported by the vehicle body and slidably engaged with the first track, the first airbag being inflatable across the first opening and along the first track to an inflated position;
a first pyrotechnic device supported by the vehicle body and connected to the first airbag, the first airbag being slidable along the first track by the first pyrotechnic device to the inflated position;
a second track supported by the vehicle body and extending along the first opening; and
the vehicle body including a first roof rail and a rocker spaced from the first roof rail, the first track extending along the first roof rail, and the second track extending along the rocker.

2. The assembly of claim 1, wherein the first airbag is expandable in a vehicle-forward direction to the inflated position.

3. The assembly of claim 1, wherein the first opening is between the first track and the second track, the first airbag being slidably engaged with the second track.

4. The assembly of claim 1, further comprising a second pyrotechnic device supported by the vehicle body and connected to the first airbag, the first airbag being slidable along the second track by the second pyrotechnic device to the inflated position.

5. The assembly of claim 1, wherein the second track is generally parallel with the first track.

6. The assembly of claim 1, wherein the vehicle body includes a second roof rail spaced from and generally parallel to the first roof rail and a second opening, the vehicle body including a roof bow extending from the first roof rail to the second roof rail, the second opening being between the first roof rail and the second roof rail and a second airbag being supported by the roof bow.

7. The assembly of claim 6, further comprising a third track supported by and extending along the second roof rail, the second airbag being slidably engaged with the third track.

8. The assembly of claim 1, further comprising a third track, the vehicle body including a second roof rail spaced from and generally parallel to the first roof rail and a second airbag, the third track being supported by and extending along the second roof rail, the second airbag being slidably engaged with the second track.

9. The assembly of claim 1, wherein the vehicle body includes a first pillar and a second pillar spaced from the first pillar, the first opening being between the first pillar and the second pillar, and the first airbag being supported by the first pillar.

10. The assembly of claim 1, further comprising a door releasably attached to the vehicle body at the first opening.

11. The assembly of claim 1, further comprising a roof panel and a floor panel spaced from the roof panel, the first airbag extending from the roof panel to the floor panel.

12. The assembly of claim 1, further comprising a roof panel releasably attached to the vehicle body and the vehicle body defining a second opening, the roof panel being releasably attached at the second opening.

13. The assembly of claim 1, further comprising a door and a roof panel, the door being releasably attached to the vehicle body at the first opening, the vehicle body including a second opening, the roof panel releasably attached to the vehicle body at the second opening, and a second airbag supported by the vehicle body and inflatable across the second opening to an inflated position.

14. The assembly of claim 1, wherein the first pyrotechnic device includes a cable extending along the first track, the cable being connected to the first airbag.

15. The assembly of claim 14, further comprising a slider slidably engaged with the first track, the slider being fixed to the first airbag and fixed to the cable.

16. The assembly of claim 1, further comprising a slider slidably engaged with the first track and fixed to the first airbag.

17. An assembly, comprising:
a vehicle body having a first opening;
a first track supported by the vehicle body and extending along the first opening;
a first airbag supported by the vehicle body and slidably engaged with the first track, the first airbag being inflatable across the first opening and along the first track to an inflated position;
a first pyrotechnic device supported by the vehicle body and connected to the first airbag, the first airbag being slidable along the first track by the first pyrotechnic device to the inflated position;
a door and a roof panel, the door being releasably attached to the vehicle body at the first opening;
the vehicle body including a second opening, the roof panel releasably attached to the vehicle body at the second opening; and
a second airbag supported by the vehicle body and inflatable across the second opening to an inflated position.

* * * * *